United States Patent [19]

Verstegen

[11] 3,970,742

[45] July 20, 1976

[54] PROCESS FOR PREPARING CYANIC ACID

[75] Inventor: Johannes D. M. Verstegen, Sittard, Netherlands

[73] Assignee: Stamicarbon B.V., Geleen, Netherlands

[22] Filed: Dec. 23, 1974

[21] Appl. No.: 535,838

[30] Foreign Application Priority Data

Dec. 27, 1973  Netherlands....................... 7317668

[52] U.S. Cl. ................................................ 423/365
[51] Int. Cl.²........................................... C01C 3/14
[58] Field of Search............................ 423/364, 365

[56] References Cited
UNITED STATES PATENTS

| | | | |
|---|---|---|---|
| 2,712,491 | 7/1955 | Boatright............................ | 423/365 |
| 2,712,492 | 7/1955 | Mackay............................... | 423/365 |
| 3,166,390 | 1/1965 | Roberts et al...................... | 423/364 |

FOREIGN PATENTS OR APPLICATIONS 908,609  10/1962  United Kingdom................. 423/365

*Primary Examiner*—Earl C. Thomas
*Attorney, Agent, or Firm*—Cushman, Darby & Cushman

[57] ABSTRACT

The invention is directed to a process for preparing cyanic acid from urea, comprising atomizing urea in a tubular reactor in the presence of a stream of a carrier gas to obviate the formation and deposition of by-products on the inner walls of the tubular reactor, thereby increasing the efficiency and production yields of the process.

8 Claims, No Drawings

PROCESS FOR PREPARING CYANIC ACID

The invention relates to a process for preparing cyanic acid from urea. Particularly the invention is directed to producing cyanic acid wherein urea is evaporated in a few seconds by heating in a tubular reactor.

The term "cyanic acid" as used hereinafter also includes isocyanic acid.

BACKGROUND OF THE INVENTION

As disclosed in United Kingdom patent specification No. 908,609, attempts have been made at converting urea into cyanic acid by pumping molten urea through a strongly heated tube, presumably to evaporate the urea. These experiments were not successful in developing a technically suitable process, since cyanuric acid which is a by-product of the process blocked the heated tube. It is believed that the by-product cyanuric acid is produced concomitantly with the initial decomposition of urea into cyanic acid and ammonia. The cyanuric acid deposition on the walls of the tubular reactor and results in ultimately blocking the heated tubular reactor. The layer of cyanuric acid impedes the transfer of heat from the tube wall to the molten urea, so that no more evaporation of urea takes place. Rather the molten urea is only heated. The fact that urea is only heated, rather than evaporated, leads to the formation of more cyanuric acid, which also deposits on the wall.

The formation and depositing of solid by-products can be prevented by evaporating urea in a finely divided state by direct heat exchange with a heated gas mixture obtained by converting cyanic acid formed by thermal cracking of urea into melamine and separating this melamine from the remaining cracking gases, in a manner described in U.S. Pat. No. 3,300,492. In this process the cracking of the urea may be effected in a vertical column. Optionally the heat required may be supplied through the wall of the column. A drawback of the process according to U.S. Pat. No. 3,300,492 is that a separate heater is needed to heat the recycled gas mixture to the temperature required for cracking.

SUMMARY OF THE INVENTION

The invention provides a process in which the heat required for cracking the urea is supplied through the wall of a tubular reactor without the formation and deposition of by-products on the inner wall of the tubular reactor. According to the invention this is achieved by atomizing molten urea in a stream of carrier gas and passing the resulting mixture through the tubular reactor under conditions under which "mist flow" occurs, while measures are taken to ensure that the temperature of the gas mixture leaving the tubular reactor is at least 250°C.

The invention will be more fully understood by reference to the detailed description which follows.

DETAILED DESCRIPTION OF THE INVENTION

The invention is directed to a process for preparing cyanic acid from urea. Particularly, the invention is directed to producing cyanic acid from urea, by evaporating urea in a heated tubular reactor. More particularly, the invention is directed to a process which is an improvement in prior art processes directed to evaporating urea in a tubular reactor, by heating the tubular reactor, to produce cyanic acid.

The invention provides a process for cracking urea, to form cyanic acid and ammonia, by atomizing liquid urea in a stream of a carrier gas and passing the resulting mixture through the tubular reactor under conditions under which "mist flow" occurs, with a proviso that heating of the walls of the tubular reactor is sufficient to insure that the temperature of the gas mixture leaving the tubular reactor is at least 250°C.

"Mist flow" here denotes the flow of a gas-liquid mixture in a tube in such a way that the liquid urea is finely divided and dispersed in the gaseous phase and is entrained as such by the gaseous phase, so that no liquid film forms along the inner wall of the tube.

The minimum superficial velocity of the carrier gas that must be used in order to effect a mist flow can be found from the relation:

$$V \geq 2.8 \, a^{0.1} \, \rho_o^{-0.4} \left( \frac{T}{p} \right)^{0.5} \left( \frac{2.5}{n_g} \right)^{0.1} (1 + a \rho_o)^{-1}$$

where
$V$ = superficial gas velocity at the entrance of the tubular reactor, in m/sec.
$a$ = amount of carrier gas/amount of urea in m$^3$ (N.T.P.)/kg
$\rho_o$ = density of carrier gas at 0°C and 1 atm abs., in kg/m$^3$
$T$ = temperature of carrier gas, in °K
$p$ = feed pressure of carrier gas, in kg/cm$^2$ abs.
$n_g$ = viscosity of carrier gas, in centipoises.

At velocities greater than V, urea will not deposit on the inner wall of the tubular reactor to form a liquid film on the wall of the reactor. Thus, the process obviates the risk of accumulation of cyanuric acid on the walls of the reactor, as well as obviating the production of ammeline and ammelide which results on prolonged heating of the cyanuric acid, produced as a by-product in the process to produce cyanic acid.

As can be seen from the formula set forth above, the process parameters of the invention, are interdependent. By process parameters is meant amount of reactants, temperatures and pressures. Thus, the conditions set forth below are not to be considered as limiting, but rather are to be considered as illustrative of the practical conditions under which the process may be undertaken at this time.

The carrier gas may be an inert gas or a mixture of inert gases. However, ammonia or a mixture of ammonia and cyanic acid are preferred carrier gases, since these gases will not require removal of the carrier gas from the products, as a separate and distinct step of the process. The amount of carrier gas is between 5 to 180 m$^3$ (N.T.P.), preferably 30 to 150 m$^3$ (N.T.P.), per Kmole of urea. Kmole is defined as the quantity of a substance whose mass is numerically equal to its molecular weight in terms of kilograms.

The only critical temperature requirement is the temperature requirement of the gas mixture leaving the tubular reactor. The temperature of the gas mixture leaving the tubular reactor, after reaction should be at least 250°C. Preferably, heating is applied to the tubular reactor so that the temperature of the gas mixture leaving the tubular reactor, under the most suitable conditions for undertaking the process of the invention, ranges between 350° and 500°C.

It has been found that complete conversion of urea into cyanic acid and ammonia may be obtained at a pressure of 1 atmosphere absolute, an amount of ammonia as carrier gas of over 0.3 m³ (N.T.P.) per kg of urea, and a superficial gas velocity of the order of about 100 m/sec. As the given equation shows these data are not critical, but illustrative for the conditions under which complete conversion of the urea can be obtained.

Practical carrier gas velocities are within the range between about 70 and 100 m/sec. At velocities below about 70 m/sec slight variations in the conditions may cause the urea to be present in the gas flow partly in the form of too large droplets, resulting in incomplete conversion. At velocities substantially in excess of about 100 m/sec the tubular reactor has to be unduly long in order to ensure a sufficiently long residence time to attain complete conversion.

The process according to the invention may be carried out in a number of cyclical stages, in which the mixture of cyanic acid and ammonia formed on cracking urea, in accordance with the process, is used as the carrier gas in a subsequent stage to convert additional amounts of urea into cyanic acid and ammonia. The carrier gas used in the first stage may be, for example, ammonia. Under these conditions, only small amounts of ammonia are necessary compared to the total amount of urea to be converted. It is also possible to recycle part of the mixture of cyanic acid and ammonia produced by cracking urea, so that the mixture of products comprising cyanic acid and ammonia are used as the carrier gas, so that no carrier gas need be supplied from a source external to the reaction zone.

The urea is introduced into the reaction zone, e.g. a tubular reactor, as molten urea.

The urea may be atomized by entrainment by the carrier gas. However, the use of spray nozzles, particularly two-phase nozzles, is to be preferred. The atomization may be carried out before introduction into the reaction zone, e.g. when the carrier gas is heated to the temperature required in the tubular reactor in a preheating zone, or in the reaction zone proper, e.g. if preheating of the carrier gas is not necessary.

The invention will be elucidated with reference to some examples.

EXAMPLE 1

1000 kg of molten urea were fed per hour to a tubular furnace containing a serpentine tube with a length of 170 m and a diameter of 75 mm. The tube was also fed with 1000 m³ (N.T.P.) of gaseous ammonia per hour. The gas velocity at the inlet of the tube was 79 m/sec. The initial pressure of the ammonia was about 2 atm. abs., the pressure at the end of the tube was 1 atm. abs. The serpentine tube was heated by combustion of 135 m³ (N.T.P.) of natural gas per hour. The average gas temperature of the gas mixture in the tube was about 400°C. The temperature of the effluent gas mixture was higher than 400°C. After 1500 hours of operation, no deposits were found on the tube wall. The urea fed in was fully converted into cyanic acid and ammonia.

EXAMPLE 2

Again 1000 kg of urea per hour were fed to a similar type of furnace. In this case the length of the serpentine tube was 250 m and the internal diameter 50 mm. The amount of ammonia fed in per hour was 500 m³ (N.T.P.). Here, too, the initial pressure of the ammonia was about 2 atm. abs., and the pressure at the end of the tube was 1 atm. abs. The gas velocity at the inlet of the serpentine tube was 86 m/sec. The furnace was fired with 125 m³ (N.T.P.) of natural gas per hour. The average temperature of the gas mixture in the serpentine tube was about 400°C, the temperature of the effluent gas mixture was higher than 400°C.

The urea was fully converted into cyanic acid and ammonia. After 1500 hours of operation, no deposits were found on the tube wall.

The advantages of the process in accordance with the invention include increased efficiency and increased yields based on urea reactants, as compared to prior art techniques producing cyanic acid from urea. Further there is no risk of the synthesis gas mixture carrying over fine solid material from a fluidized bed as used in present commercial processes for manufacturing melamine in which isocyanic acid is formed as an intermediary product, and also the formation of lumps of fluidized bed material with insufficiently atomized liquid urea is avoided.

What is claimed is:

1. A process for preparing cyanic acid from urea by evaporating urea in a tubular reaction zone, comprising atomizing molten urea into a stream of carrier gas, passing the resulting mist of fine urea droplets in said carrier gas through said tubular reaction zone, heating the tubular reaction zone so that the temperature of the gas mixture leaving the reaction zone is at least 250°C, wherein said carrier gas is introduced into the reaction zone at a rate at least equal to V, wherein $$V \geq 2.8\, a^{0.1}\, \rho_o^{-0.4} \left( \frac{T}{p} \right) 0.5\, \frac{2.5}{n_g}^{-0.1} (1 + a\, \rho_o)^{-1}$$

where
$V$ = superficial gas velocity at the entrance of the tubular reactor, in m/sec.
$a$ = amount of carrier gas/amount of urea in m³ (N.T.P.)/kg
$\rho_o$ 32 density of carrier gas at 0°C and 1 atm. abs., in kg/m³
$T$ = temperature of carrier gas, in °K
$p$ = feed pressure of carrier gas, in kg/cm² abs.
$n_g$ = viscosity of carrier gas, in centipoises 2. The process according to claim 1, characterized in that 5 - 180 m³ (N.T.P.) of carrier gas per Kmole of urea are fed to the tubular reactor.

3. The process according to claim 1, characterized in that heating is undertaken to ensure that the temperature of the gas mixture leaving the tubular reactor ranges between 350° and 500°C.

4. The process according to claim 1, characterized in that the carrier gas used is ammonia.

5. The process according to claim 1, characterized in that the carrier gas used is a mixture of cyanic acid and ammonia.

6. The process according to claim 1, characterized in that an amount of urea atomized in a carrier gas is converted into cyanic acid and ammonia in a reaction zone to produce a gas mixture, subsequently additional amounts of urea are atomized in the resulting gas mixture, and the mixture of urea, cyanic acid and ammonia which is thus obtained is passed into a reaction zone.

7. In the process according to claim 1, wherein said preparation of cyanic acid results in a gas mixture containing cyanic acid.

8. The process according to claim 7, wherein said gas mixture consists essentially of cyanic acid and ammonia.

* * * * *

UNITED STATES PATENT OFFICE
CERTIFICATE OF CORRECTION

Patent No. 3,970,742         Dated July 20, 1976

Inventor(s) Johannes D.M. VERSTEGAN

It is certified that error appears in the above-identified patent and that said Letters Patent are hereby corrected as shown below:

In Claim 1, please correct the formula to read as follows:

$$V \geq 2.8 \, a^{0.1} \, \rho_o^{-0.4} \, \left(\frac{T}{p}\right)^{0.5} \, \left(\frac{2.5}{n_g}\right)^{0.1} \, (1 + a \, \rho_o)^{-1}$$

In Claim 1, on line 39, the number "32" should be deleted and replaced by -- = --.

Signed and Sealed this

First Day of February 1977

[SEAL]

Attest:

RUTH C. MASON  
*Attesting Officer*

C. MARSHALL DANN  
*Commissioner of Patents and Trademarks*